(12) United States Patent
Seybold et al.

(10) Patent No.: US 10,703,392 B2
(45) Date of Patent: Jul. 7, 2020

(54) GENERATOR SYSTEM FOR RAIL VEHICLES

(71) Applicant: Schaeffler Technologies AG & Co. KG, Herzogenaurach (DE)

(72) Inventors: Alexander Seybold, Bischberg (DE); Christoph Marquardt, Bergrheinfeld (DE); Rupert Stitzinger, Schweinfurt (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 314 days.

(21) Appl. No.: 15/579,315

(22) PCT Filed: Jun. 8, 2016

(86) PCT No.: PCT/DE2016/200264
§ 371 (c)(1),
(2) Date: Dec. 4, 2017

(87) PCT Pub. No.: WO2016/198068
PCT Pub. Date: Dec. 15, 2016

(65) Prior Publication Data
US 2018/0297614 A1 Oct. 18, 2018

(30) Foreign Application Priority Data
Jun. 12, 2015 (DE) .......... 10 2015 210 773

(51) Int. Cl.
*B61D 43/00* (2006.01)
*H02K 7/18* (2006.01)
(Continued)

(52) U.S. Cl.
CPC .......... *B61D 43/00* (2013.01); *B61F 15/12* (2013.01); *B61F 15/26* (2013.01); *H02K 7/1846* (2013.01); *Y02T 30/36* (2013.01)

(58) Field of Classification Search
CPC .......... B61D 43/00; B61F 15/12; B61F 15/28; H02K 7/1846; Y02T 30/36
See application file for complete search history.

(56) References Cited

U.S. PATENT DOCUMENTS 381,915 A * 5/1888 Dey .......... B61D 43/00
105/114
469,799 A * 3/1892 Willson .......... B61D 43/00
105/114

(Continued)

FOREIGN PATENT DOCUMENTS

CN 1223940 A 7/1999
CN 200954847 Y 10/2007
(Continued)

*Primary Examiner* — Ryan A Reis
(74) *Attorney, Agent, or Firm* — Kevin L. Parks

(57) ABSTRACT

The disclosure relates to a generator system for rail vehicles, for example, a system including a generator with a rotor and a stator, and a journal box unit. The journal box unit may include a bearing for mounting an axle, and a bearing housing. An end cap is arranged on the front face of the axle. The end cap is connected to the axle for co-joint rotation therewith, and the stator is connected to the bearing housing. A friction wheel is arranged on the outer circumferential surface of the end cap, the friction wheel being designed as the rotor of the generator.

16 Claims, 1 Drawing Sheet

(51) Int. Cl.
*B61F 15/12* (2006.01)
*B61F 15/26* (2006.01)

(56) References Cited

U.S. PATENT DOCUMENTS

| | | | | |
|---|---|---|---|---|
| 3,702,570 A | * | 11/1972 | Stikkers | F16H 7/02 |
| | | | | 474/89 |
| 4,165,466 A | * | 8/1979 | Stikkers | B60K 25/08 |
| | | | | 290/3 |
| 5,828,135 A | * | 10/1998 | Barrett | B60T 1/10 |
| | | | | 290/3 |
| 2006/0169169 A1 | * | 8/2006 | Martina | B61D 43/00 |
| | | | | 105/182.1 |

FOREIGN PATENT DOCUMENTS

| | | |
|---|---|---|
| CN | 202046202 U | 11/2011 |
| CN | 202703310 U | 1/2013 |
| DE | 604126 C | 10/1934 |
| DE | 2429298 A1 | 1/1976 |
| DE | 3933640 A1 | 4/1991 |
| EP | 0642008 A2 | 3/1995 |
| GB | 190303620 A | 4/1904 |

* cited by examiner

GENERATOR SYSTEM FOR RAIL VEHICLES

CROSS-REFERENCE TO RELATED APPLICATIONS

This application is the U.S. National Phase of PCT Appln. No. PCT/DE2016/200264 filed Jun. 8, 2016, which claims priority to DE 102015210773.6 filed Jun. 12, 2015, the entire disclosures of which are incorporated by reference herein.

TECHNICAL FIELD

The disclosure relates to a generator system for rail vehicles, comprising a generator with a rotor and a stator, as well as a journal box unit, wherein the journal box unit comprises a bearing for support of an axle and a bearing housing, wherein on the front face of the axle an end cap is arranged and provision is made for co-joint connection between end cap and axle, and wherein the stator is connected with the bearing housing.

BACKGROUND

In DE 39 33 640 C2 an electrical energy supply device is disclosed for a railway train consist, wherein the energy supply device is attached so as to be able to be incorporated together with a coupling rod between two adjoining cars of the train consist, and attached via a carrier encompassing a coupling rod on the coupling rod. The energy supply device has a generator which is driven by a drive wheel running on the rail directly while inserting appropriate transmission elements.

Additional examples of generator systems for rail vehicles with friction-wheel drives are given in U.S. Pat. No. 5,828,135 and in GB 1903 0 3620.

To couple one of the named energy supply devices to a typical and customary journal box unit would involve high design expense.

SUMMARY

Accordingly one object of the present disclosure is to disclose a cost-effective and simple generator system for rail vehicles, which can easily be adapted to any journal box units without high design expense.

To attain the disclosure-specific object, generator systems are described and illustrated herein. Optional advantageous embodiments are also disclosed.

The disclosure-specific generator system may be characterized in that on the outer circumferential surface of the end cap, a friction wheel is arranged, wherein the friction wheel is configured as a rotor of the generator. For example, the rotor can be configured as a casing or have a U-shape. Preferably the friction wheel is compressed onto the end cap by spring force.

There are multiple embodiment options to attain nearly slip-free driving of the rotor and thus of the generator. For example, the end cap and the friction wheel on their outer circumferential surfaces can have profilings that match each other. What is meant by profiling is a shaping of the surface by a structure, so that the surface has correspondingly configured extensions and recesses. The structures can be configured to be regular or irregular. However, it is also conceivable that only the friction wheel, which means the rotor, or only the end cap on the particular outer circumferential surface, has profiling.

Another embodiment option is to coat the end cap. For this, the outer circumferential surface of the end cap may be coated with a sand-like material, especially a coarse one, which also results in profiling.

However, the outer circumferential surface of the end cap can also for example have an elastic rubber surface, such as a soft one. This means that the choice of materials represents a design option, which influences the driving of the rotor.

Additionally it may be advantageous if the bearing housing partially encloses the bearing. This means that the bearing housing does not surround the bearing completely, and thus there is no closed bearing housing. In one embodiment, the bearing housing encloses less than 50% of the bearing. The bearing housing is configured as an adapter, for example.

In addition it is intrinsic to the disclosure if a dual-row roller bearing is arranged in the bearing housing. Preferably this is a dual-row conical roller bearing in an O-arrangement. But also, for example, cylindrical roller bearings or spherical roller bearings can be used. The roller bearing can be arranged on the axle by means of a pressed connection. The axle can be designed as a solid or a hollow shaft.

In addition it is appropriate if the generator has an axis of rotation that is arranged radially within the contour of the bearing housing. This means that at most 45% of the generator projects out over the contour of the bearing housing.

The current generated by the generator can be used for example for a measuring device to check the functional capability of the roller bearing.

BRIEF DESCRIPTION OF THE DRAWINGS

Additional particulars, features, combinations of features and effects based on the disclosure are gleaned from the following specification of an embodiment of the disclosure, and from the drawings. Shown in these are.

DETAILED DESCRIPTION

Figure 1:
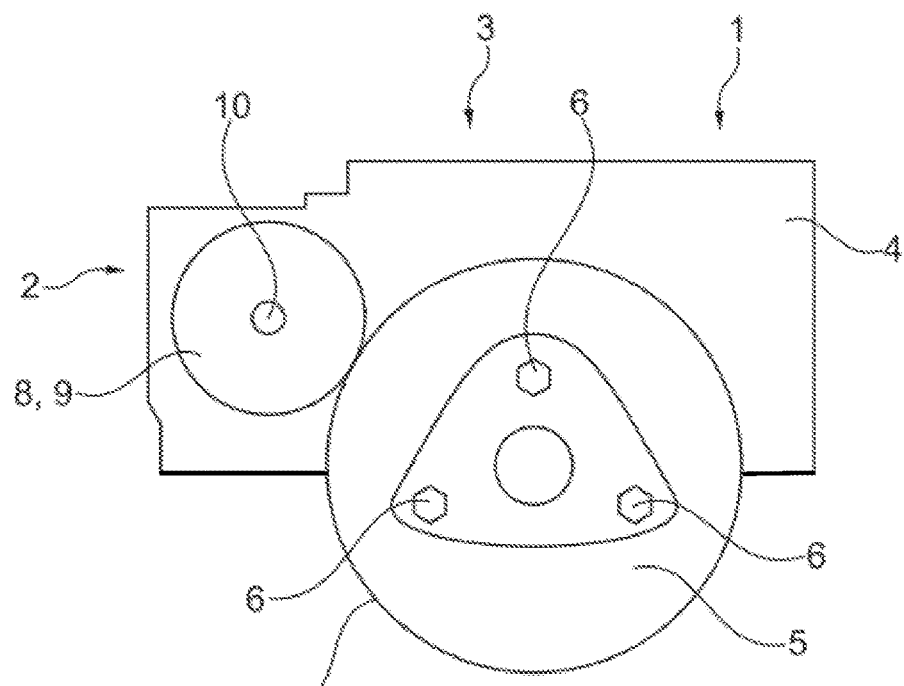
FIG. 1: an embodiment of a disclosure-specific generator system.
Figure 2:
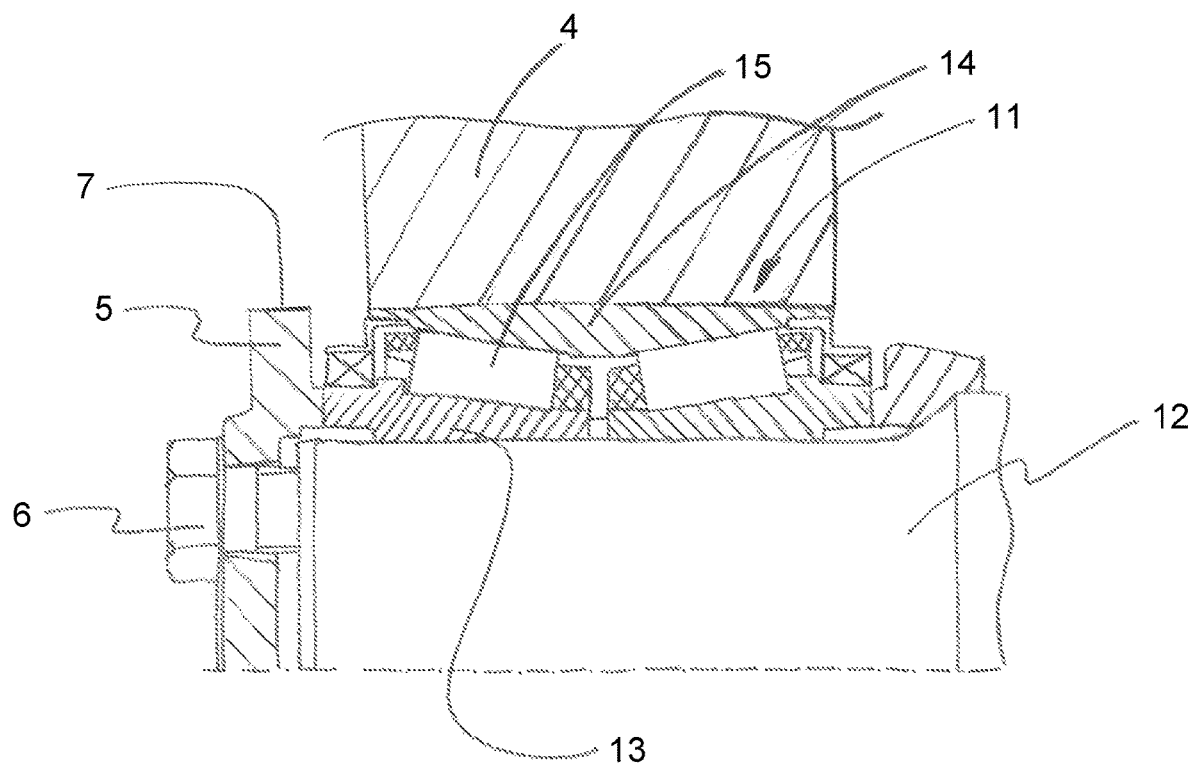
FIG. 2: a partial cross-sectional view of a portion of the generator system of FIG. 1.

FIG. 1 schematically depicts an embodiment of a generator system 1 in a front view. FIG. 2 schematically depicts a partial cross-sectional view of a portion of generator system 1. Generator system 1 comprises a generator 2 and a journal box unit 3. Journal box unit 3 comprises a roller bearing 11 for support of an axle 12.

The roller bearing 11 comprises an inner ring 13, an outer ring 14 and roller elements 15 arranged between them. On the outer ring of the roller bearing a bearing housing 4 is arranged, which is not closed and which only partially surrounds the roller bearing. The bearing housing 4 is an adapter, which can be connected with the rail vehicle.

On the front face of the axle 12, an end cap 5 is arranged. End cap 5 is co-joint connected by means of three connection elements 6 with the axle. On the outer circumferential surface 7 of end cap 5, a friction wheel 8 makes contact, with friction wheel 8 configured as a rotor 9 of generator 2. This means that friction wheel 8 rolls on the outer circumferential surface 7 of end cap 5. Rotor 9 and friction wheel 8 respectively are thus driven by the turning motion of the axle, through which current is generated in generator 2. Rotor 9 is in addition configured as a casing. by the turning motion of the axle, through which current is generated in generator 2. Rotor 9 is in addition configured as a casing.

Generator 2 includes the already described rotor 9 as well as a stator 10. Rotor 9 is supported by a rotor support, not shown, on stator 10. The rotor support is preferably configured as a roller bearing, especially as a rolling bearing. In addition, stator 10 is attached to the fixed bearing housing 4.

LIST OF REFERENCE SYMBOLS
1 generator system
2 generator
3 journal box unit
4 bearing housing
5 end cap
6 connection element
7 outer circumferential surface
8 friction wheel
9 rotor
10 stator
11 roller bearing
12 axle
13 inner ring
14 outer ring
15 roller elements

The invention claimed is:

1. A generator system for rail vehicles, comprising:
a generator, with a rotor and a stator, as well as a journal box unit, wherein the stator is arranged radially inside of the rotor and the journal box unit comprises a bearing for support of an axle and a bearing housing contacting the bearing;
an end cap is arranged on a front end of the axle and a co-joint connection is provided between the end cap and axle;
the stator is connected with the bearing housing; and
a friction wheel is arranged on an outer circumferential surface of the end cap, with the friction wheel configured as a rotor of the generator.

2. The generator system of claim 1, wherein the end cap and the friction wheel have, on outer circumferential surfaces thereof, profiling that corresponds to each other.

3. The generator system of claim 1, wherein the outer circumferential surface of the end cap is coated with a coarse material that provides a profiling on the outer circumferential surface.

4. The generator system of claim 1, wherein the outer circumferential surface of the end cap has an elastic rubber surface.

5. The generator system of claim 1, wherein the bearing housing only partially encloses the bearing.

6. The generator system of claim 1, wherein a dual-row roller bearing is arranged in the bearing housing.

7. The generator system of claim 1, wherein the generator has an axis of rotation that is arranged radially within a contour of the bearing housing.

8. A generator system for rail vehicles, comprising:
an axle;
a generator including a rotor, a stator arranged radially inside of the rotor, and a journal box unit, wherein the journal box unit includes a bearing housing connected to the stator and a bearing configured to support the axle;
an end cap arranged on and connected to a front end of the axle; and
a friction wheel arranged on an outer circumferential surface of the end cap;
wherein the friction wheel is the rotor of the generator.

9. The generator system of claim 8, wherein the end cap and the friction wheel have, on respective outer circumferential surfaces thereof, profiling that corresponds to each other.

10. The generator system of claim 8, wherein the outer circumferential surface of the end cap is coated with a coarse material that provides a profiling on the outer circumferential surface.

11. The generator system of claim 8, wherein the outer circumferential surface of the end cap has an elastic rubber surface.

12. The generator system of claim 8, wherein the bearing housing only partially encloses the bearing.

13. The generator system of claim 8, wherein a dual-row roller bearing is arranged in the bearing housing.

14. The generator system of claim 8, wherein the generator has an axis of rotation that is arranged radially within a contour of the bearing housing.

15. The generator system of claim 1, wherein the bearing housing is configured as an adapter that encloses less than 50% of the bearing.

16. The generator system of claim 1, wherein the endcap is a single endcap and the friction wheel contacts only the single endcap.

* * * * *